Nov. 24, 1959  J. J. HILDEBRANDT ET AL  2,913,848
FISHING LURE
Filed April 1, 1957
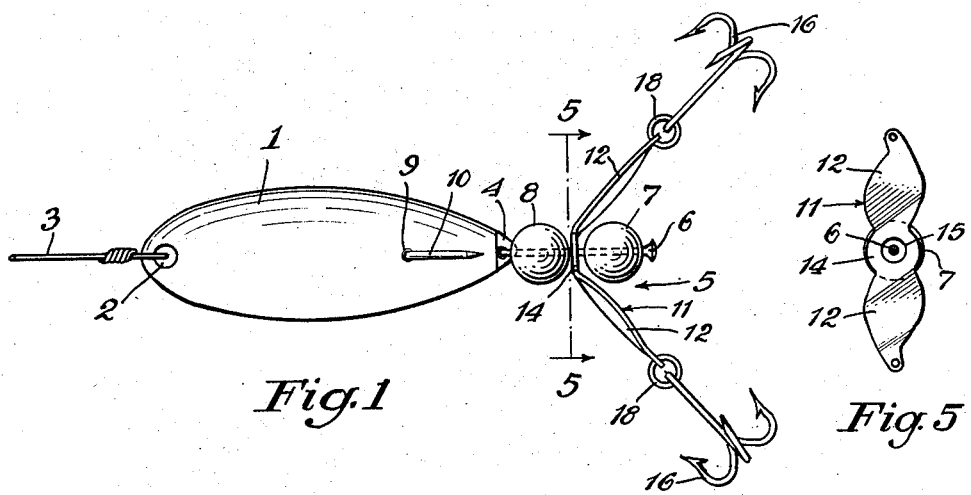
Fig. 1
Fig. 5
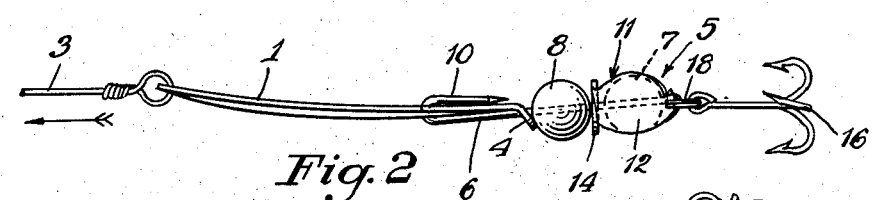
Fig. 2
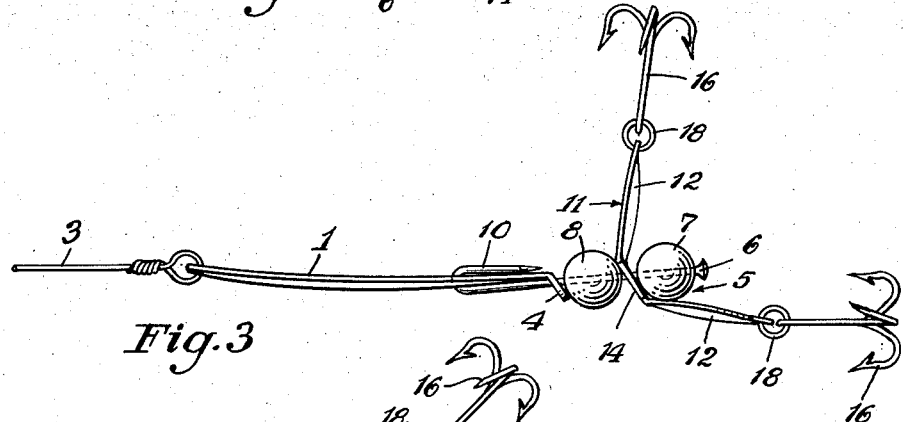
Fig. 3
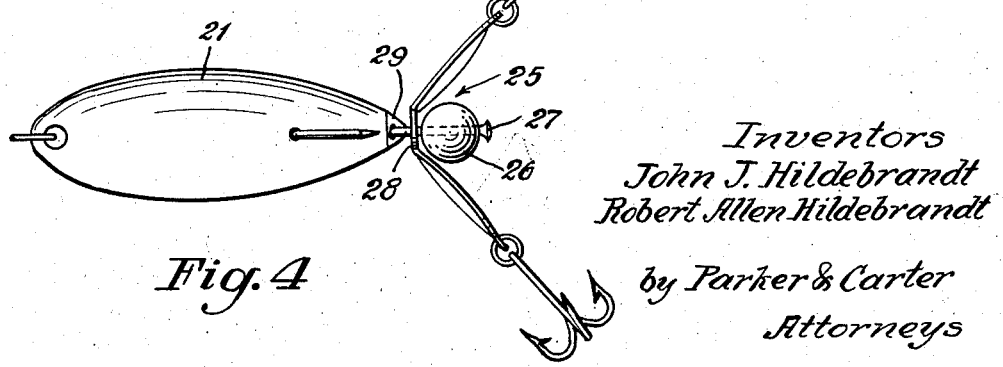
Fig. 4
Inventors
John J. Hildebrandt
Robert Allen Hildebrandt
by Parker & Carter
Attorneys United States Patent Office 2,913,848
Patented Nov. 24, 1959

2,913,848
FISHING LURE

John J. Hildebrandt and Robert Alan Hildebrandt, Logansport, Ind., assignors to John J. Hildebrandt Corporation, Logansport, Ind., a corporation of Indiana Application April 1, 1957, Serial No. 649,712

5 Claims. (Cl. 43—42.16)

This invention is directed to the art of artificial fishing lures and has for its main object a novel arrangement of hooks combined with a novel motion simulating effect in the lure.

Another purpose of the invention is to provide a fishing lure body with a novel arrangement of hooks whereby the hooks are effective irrespective of the direction of approach of a fish with respect to the lure body.

Another purpose of the invention is to provide a fishing lure blade with a system of balancing that prevents fouling of the fishing line with the hooks of the lure.

Another purpose of the invention is a fishing lure with an oscillating or rocking body motion and a simulated tail motion as the lure is drawn through water.

Another purpose of the invention is to provide a novel propeller and hook arrangement wherein a propeller blade, hook and lure body assume a substantially lineal arrangement when a rearward force is applied to one of the hooks of the lure.

Another purpose of the present invention is the creation of a novel counterweight for a lure blade body wherein the counterweight also acts as a thrust bearing for a propeller or spinner mounted for rotation with respect to the body.

Other objects and purposes will appear more fully in the ensuing specifications and claims.

Referring generally now to the drawings:

Figure 1 is a plan view of the present invention;

Figure 2 is a side elevation of the parts illustrated in Figure 1;

Figure 3 is a side elevation similar to that of Figure 2 but illustrating a different operative position of the elements of the invention;

Figure 4 is a plan view of a modification; and

Figure 5 is a section, with parts omitted, taken on line 5—5 of Figure 1.

Like elements are designated by like characters throughout the specification and drawings.

Referring specifically to the drawings and in the first instance to Figure 1, 1 designates a fishing lure body. The body is preferably formed as a blade having a slight curvature from the forward portion to the rearward portion thereof. It may have a shape, as seen in the plan view, corresponding generally to that of a teardrop. The forward end of the body may be provided with an aperture 2 to which is attached a fishing line 3.

The lure body may be formed as a metal stamping. It can be brass or steel stamping although the invention should not be limited to any specific type of material for the blade body.

The rearward end of the body is provided with an apertured ear 4 which is adapted to support a propeller, hook, and counterweight assembly designated generally at 5.

A pin 6 is mounted on the rearward end of the body and is adapted to extend generally parallel to the longitudinal axis of the lure body. A pair of counterweight balls, which may have a generally spherical shape, are designated at 7 and 8. The balls 7 and 8 are mounted for rotation on the pin 6. The pin 6 is passed through the apertured ear 4 and extends through an aperture 9 in an intermediate portion of the body. The end portion 10 of the pin is bent rearwardly along that surface of the body which is opposite to the surface over which the remainder of the pin extends.

A propeller 11 is mounted for rotation on the pin between the two balls 7 and 8. The propeller may be formed as a metal stamping. As will be seen most clearly in Figures 1 and 2, the propeller may have two or more blades 12. The central portion 14 of the propeller has an aperture 15 that is enlarged with respect to the diameter of the pin as is seen most clearly in Figure 5. The axis of the individual blades 12 are inclined rearwardly with respect to the axis of rotation defined by the pin 6 for a purpose that will appear more fully hereinafter.

Any suitable hook which may, for example, be in the form of a treble hook 16, is attached to the end of each of the propeller blades as by means of a ring 18.

Figure 4 illustrates a modification of the invention. In Figure 4, the blade body 21 and propeller hook and counterweight assembly 25 correspond in all details to the similar parts 1 and 5 of Figure 1 with the exception that only a single counterweight ball 26 is employed in the modification of Figure 4. In Figure 4 the propeller is shown as mounted on the pin 27 and the central portion of the propeller 28 is confined between the counterweight ball 26 and the apertured ear 29 on the blade body.

For comparatively large fishing lures, two or more counterweight balls may be employed as in the form of the invention shown in Figure 1. Where small lures are employed, only a single counterweight ball may be necessary as appears in Figure 4.

Whereas, we have shown and described an operative form of our invention, it should be understood that this showing and description thereof is to be taken in an illustrative or diagrammatical sense only. There are many modifications of the invention which will be apparent to those skilled in the art and which will fall within the scope and spirit of the invention. The scope of the invention should be limited only by the scope of the hereinafter appended claims.

The use and operation of our invention are as follows:

We illustrate a blade body 1 that is adapted to be propelled through the water as by the line 3. When the lure is drawn through the water, the convex side of the blade is disposed downwardly as appears in Figure 2. When the lure is drawn through the water, the counterweights at the rearward end of the lure tend to pull the lure body downwardly. The pull applied to the lure in the direction of the arrow illustrated in Figure 2 tends to pull the convex side of the lure body against the water. Thus the body will tend to have an oscillating or rocking motion as it is drawn through the water. This motion causes first one side and then the other of the lure body to raise and lower creating a vibration effect.

During the course of the movement through the water, the propeller 11 will rotate. The propeller may develop a rotational speed sufficient to cause the hooks 16 and 17 to move outwardly by centrifugal force. Thus the hooks are disposed at points above the lure body, as well as at points below the lure body and to the sides of the lure body. The hooks describe a circular path during their motion about the axis of the pin 6. It will be seen, therefore, that the hooks will be effective regardless of whether the lure is approached by a fish from below the lure, from above the lure, or from the sides of the lure.

The body of the lure and the propeller, which may be given a bright plated finish in order to enhance their reflective qualities, create a simulated oscillatory motion of the body with a simulated "fanning" motion of the tail. The propeller blades in the course of their circular movement create the effect of a generally conic reflective surface undergoing motion. The body and propeller may be given a colored enamel finish in lieu of the bright plate. Various colors may be used.

When a fish strikes the lure and is snared by one of the hooks 16, the propeller blade, hook and lure body tend to assume a substantially linear position as is illustrated in Figure 3. The comparatively loose fit of the propeller on the pin 6 and the rearward disposition of the blade axis allow the propellers to be rocked forwardly and rearwardly on the axis as appears in Figure 3. This increases the purchase applied from the line 3 to the hook 16, and transmits thrust through the hook, propeller and body in essentially a linear manner. Furthermore, this allows the central portion 14 of the propeller to bear against the spherical bearing surface presented by the counterweight 7 or 26. By allowing for the substantially linear disposition and by forming the bearing surface in this fashion to absorb the thrust, the possibility of the propeller blades being bent by the rearward pull exerted by the fish, is substantially lessened.

When the lure is cast, the counterweight or counterweights carry the rearward end of the lure outwardly, thus insuring that the hooks 13 are disposed away from the line. This prevents fouling the line.

We claim:

1. In a fishing lure, a generally elongated blade body having fishing line attaching means at one end thereof, a counterweight ball mounted for rotation on a pin carried by the other end of said lure body, said body having a generally convex surface adapted to face downwardly when the lure is drawn through the water, whereby the body undergoes a rocking motion in response to the force exerted by the line and the force exerted by the counterweight, a propeller mounted on said pin between said body and said ball, and hooks attachd to the ends of the propeller blades, the propeller blades being twisted to present a generally reflective surface and adapted to rotate when said lure is drawn through water whereby the propeller simulates tail motion while presenting the hooks in a circular disposition while said propeller is rotating.

2. In a fishing lure, a generally elongated blade body having fishing line attaching means at one end thereof, a counterweight ball mounted for rotation on a pin carried by the other end of said lure body, said body having a generally convex surface adapted to face downwardly when the lure is drawn through the water, whereby the body undergoes a rocking motion in response to the force exerted by the line and the force exerted by the counterweight, a propeller mounted on said pin between said body and said ball, and hooks attached to the ends of the propeller blades, the propeller blades being twisted to present a generally reflective surface and adapted to rotate when said lure is drawn through water whereby the propeller simulates tail motion while presenting the hooks in a circular disposition while said propeller is rotating, the axis of said blades being rearwardly inclined with respect to the axis of rotation, said propeller making a comparatively loose fit with said pin, whereby a rearwardly pulling force exerted on one of said hooks tends to cause the blade body, propeller blade, and hook to assume a substantially linear position.

3. The structure of claim 2 wherein a second counterweight ball is mounted on said pin and said propeller is confined for rotation between the balls.

4. The structure of claim 2 wherein the rearward portion of said blade body has an apertured ear through which the pin extends, and said propeller is confined for rotation between said ear and said counterweight ball.

5. The structure of claim 2 wherein said pin extends through an apertured ear on the rearward portion of said blade body, and through an aperture in an intermediate portion of said blade body, and said pin is folded rearwardly from the aperture in the intermediate portion of said blade body.

References Cited in the file of this patent

UNITED STATES PATENTS

| 1,460,905 | Huntington | July 3, 1923 |
| 1,871,387 | Pflueger | Aug. 9, 1932 |
| 2,214,668 | Erickson | Sept. 10, 1940 |
| 2,223,922 | Schofield | Dec. 3, 1940 |
| 2,266,234 | Mitchell | Dec. 16, 1941 |
| 2,439,621 | Himotlu | Apr. 13, 1948 |
| 2,449,692 | Eichendorff | Sept. 21, 1948 |
| 2,507,454 | Nelson | May 9, 1950 |
| 2,586,141 | Angell | Feb. 19, 1952 |

FOREIGN PATENTS

| 521,443 | Canada | Feb. 7, 1956 |
| 993,272 | France | July 18, 1951 |